United States Patent

[11] 3,591,292

[72] Inventors Wilfred C. Feuchter
 Mishawaka, Ind.;
 Burton L. Lockwood, Mishawaka, Ind.;
 Clement P. Means, Ann Arbor, Mich.;
 Marvin Weiss, Ann Arbor, Mich.; Jerome
 Firuer, deceased, late of South Bend, Ind.;
 Burton L. Lockwood, administrator,
 Mishawaka, Ind.
[21] Appl. No. 740,424
[22] Filed June 3, 1968
[45] Patented July 6, 1971
[73] Assignee The Bendix Corporation

[54] OPTICAL CONTROL DEVICE
 19 Claims, 7 Drawing Figs.
[52] U.S. Cl. .................................................. 356/141,
 250/203
[51] Int. Cl. ........................................... G01b 11/26
[50] Field of Search ............................................. 356/141;
 250/203

[56] References Cited
UNITED STATES PATENTS
| | | | |
|---|---|---|---|
| 3,260,849 | 7/1966 | Poyle | 250/203 |
| 3,263,088 | 7/1966 | Goldfischer | 356/141 |
| 3,290,505 | 12/1966 | Stavis | 250/203 |
| 3,470,377 | 9/1969 | LeFebre | 250/203 |

*Primary Examiner*—Rodney D. Bennett, Jr.
*Assistant Examiner*—Joseph G. Baxter
*Attorneys*—C. F. Arens and Plante, Arens, Hartz & O'Brien ABSTRACT: An optical control device responsive to a localized source of light by means of a quadrant array detector means being mounted on an electromagnetic flexure means for controlling the position of said detector means relative to said localized source of light so as to proportion said source of localized light equally in each of said detector quadrants. The device further has electronic closed-loop means responsive to said quadrant array detector means intermediate said quadrant array detector means and said electromagnetic flexure means.

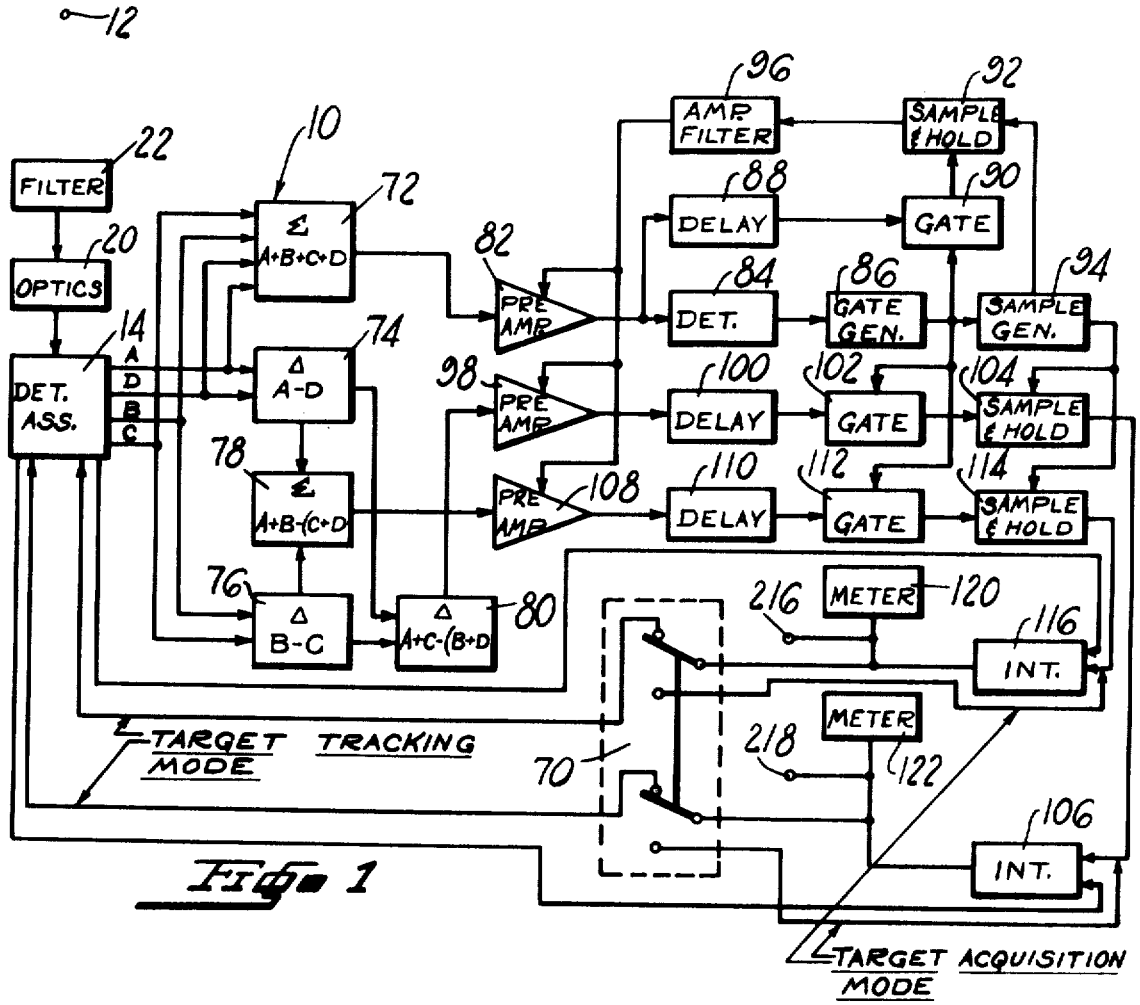
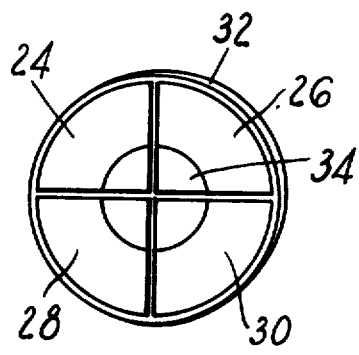
*Fig. 2*
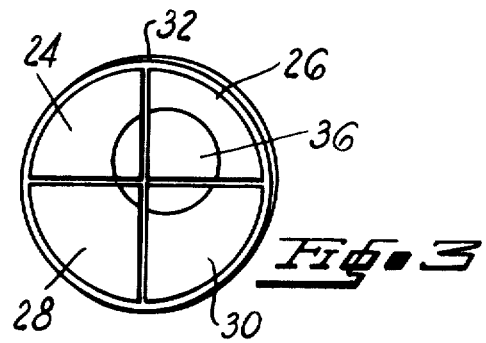
*Fig. 3*

OPTICAL CONTROL DEVICE

BACKGROUND OF THE INVENTION

The invention relates to optical control devices of the variety generally used in association with target tracking or weapon guidance applications. However, it is felt that the invention is sufficiently broad in concept to facilitate its use for any application where optical control is required.

The conventional optical control devices with which we are familiar are comprised of closed-loop tracking systems that employ gears, motors, pivots, linkages or other similar mechanical mechanisms to acquire and retain detection of the target image by the photosensitive element. These concepts require numerous moving parts, and thus, are costly to manufacture and maintain. Moreover, these unduly complex systems have proven themselves to be unreliable, resulting in loss of target tracking.

SUMMARY OF THE INVENTION

It is the purpose of this invention to provide an optical control device that employs a quadrant array photodetector which facilitates the use of amplitude monopulse electronic signal processing, and to mount the photodetector on a two-axis electromagnetic flexure means which reduces the number of moving parts to one. A closed-loop electronic array photodetector electrically produces two magnetic fields which result in two forces, one each to deflect the vertical and horizontal components of the flexure means. Further, the use of the amplitude monopulse signal-processing technique in combination with an optical control device of the type described herein allows this system to operate with continuous or intermittent light sources, and with regular or random pulse repetition rates. Additionally, the simplicity of this system will result in a substantial cost reduction over prior devices as well as perform very reliably in its use environment.

The above-mentioned and other features and objects of this invention and the manner of attaining them will become more apparent and the invention itself will be best understood by reference to the following description of embodiments of the invention taken in conjunction with the accompanying drawings.

BRIEF DESCRIPTION OF THE DRAWINGS

FIG. 1 is a block diagram of the optical control device;

FIG. 2 is a front view of the quadrant array photodetector depicting an on-axis image;

FIG. 3 is a front view of the quadrant array photodetector depicting an image having its vertical and horizontal components off center;

DESCRIPTION OF THE PREFERRED EMBODIMENT

Figure 4:
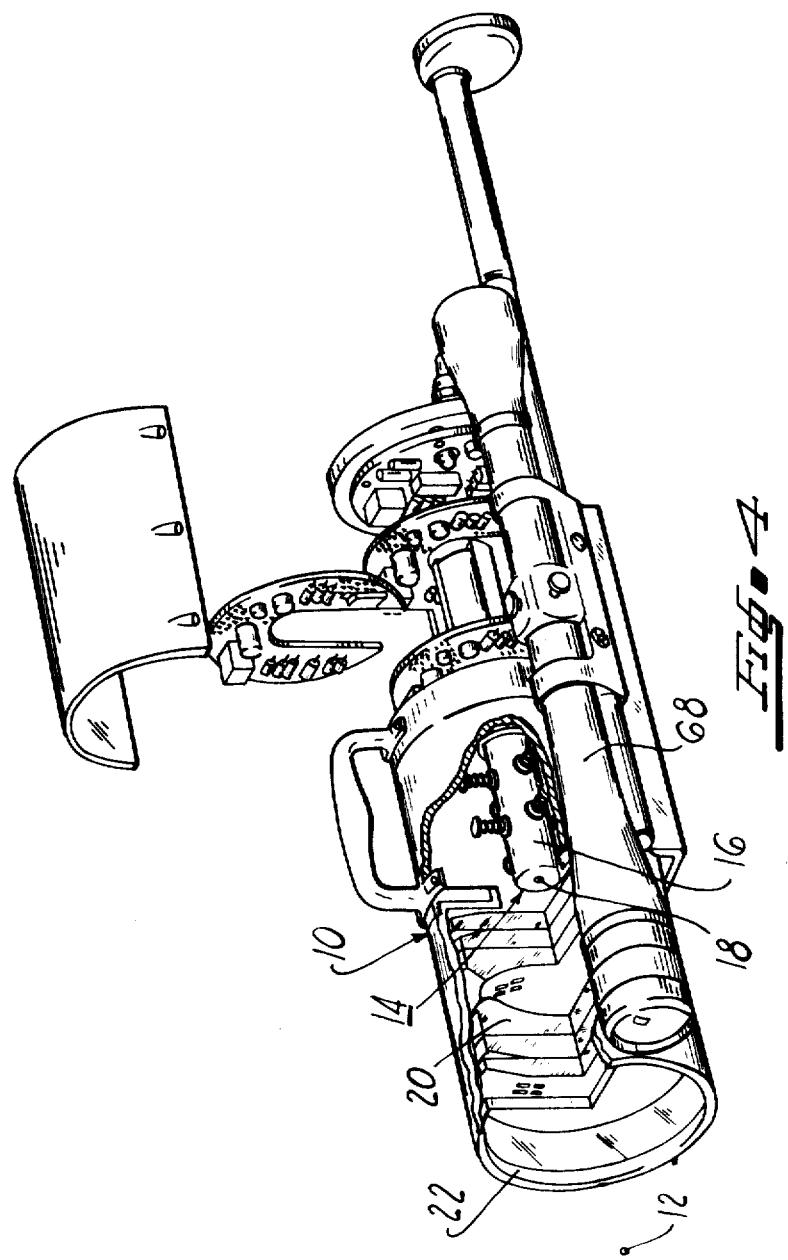
FIG. 4 is a pictorial perspective, partly sectioned, view of a tracking system embodying this invention.

Referring to the drawings and particularly to FIG. 1, the optical control device is indicated by reference numeral 10. The optical control device 10 is pictorially shown in FIG. 4 embodied in a tracking system application. Further, its functional capabilities are such that it can be adapted for a variety of tracking applications.

The optical control device 10 is responsive to a localized source of light 12. Said localized source of light approaches that of a point source and has a wavelength of emission that lies in the visible or near infrared portions of the electromagnetic spectrum. In a tracking application, the optical control device 10 may be used for tracking a localized light source 12, such as an injection laser mounted on a guided missile.

Detector assembly 14 of optical control device 10 is comprised of a two-axis electromagnetic flexure means 16 and a quadrant array detector means 18 and is responsive to said localized source of light 12 through an optical means 20 and a filter means 22.

The filter means 22 is employed to limit the spectral response of said quadrant array detector 18 and thereby improve the signal-to-noise ratio of the optical tracking device 10. As can be seen by those skilled in the art, the spectrum to which filter means 22 is responsive may be optimized to cooperate with said quadrant array detector 18 for a variety of tracking requirements.

The optical system 20 uses conventional lens and image collection for providing light inputs to said quadrant array detector 18. The specific design parameters associated with the optical system 20 and the field of view of the optical tracking device 10 may be readily determined by anyone skilled in the art and adapted to suit whatever specific tracking requirement that may exist.

The array detector means 18, as shown best in FIG. 2, is comprised of photodiodes 24, 26, 28, and 30, forming the quadrants of a circle and being fixed to mounting plate 32. The spacing between said diodes is very close to maximize the photosensitive inner area of the array detector means 18. These solid-state detector diodes may be optimized in terms of sensitivity and speed for any particular spectral region of interest. In response to a source of light 12 the photodiodes 24, 26, 28, and 30, will provide output signals A, B, C, and D, respectively. For a pulsed source of light 12, the photodiode output signals A, B, C, and D, are pulses whose amplitude is proportional to the incident energy falling on each of the diodes. If the object point 34 from the source of light 12 is on-axis, as shown in FIG. 2, the four pulses are equal in amplitude; i.e., A=B=C=D. If an object point 36 from the source of light 12 is off-axis, as shown in FIG. 3, the four pulses would be unequal in amplitude. The sensing principle of the tracking system 10 results from the fact that when an image from the light source 12 falls slightly off-axis of the detector means 18, an unbalance will exist in output signals A, B, C, and D, from the photodetector quadrants. These outputs may then be expressed as error signals in terms of vertical and horizontal displacement from an on-axis balanced condition. Thus, any unbalanced condition will have a vertical and/or horizontal signal error to reestablish the on-axis balanced condition.

The vertical signal error or pitch angular error, $\theta p$, is a known function of Y.

$\theta p = f(Y)$ where $Y = A+B-(C+D)$ A, B, C, and D are the amplitudes of the four pulses.

The horizontal signal error or yaw angular error, $\theta y$, is a known function of X.

$\theta y = f(X)$ where $X = A+C-(B+D)$

Therefore, vertical and horizontal error signals are available from the photodiode outputs A, B, C, and D, relating their position relative to said source of light 12.

Figure 5:
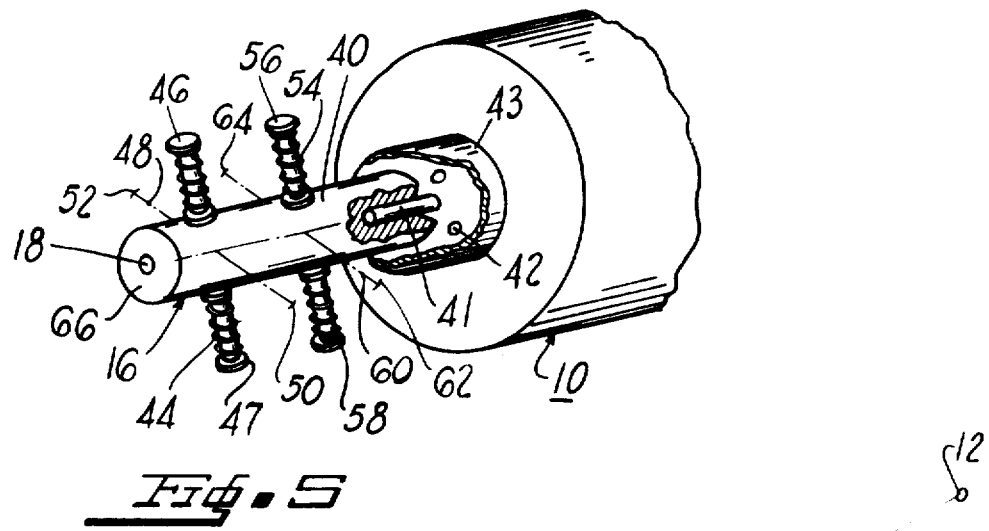
FIG. 5 is a perspective view of the detector assembly depicting its functional elements.

Referring now to FIGS. 4 and 5, the two-axis electromagnetic flexure means 16 is comprised of a cantilevered means 40 rigidly attached to a flexible member or shaft 41 which, in turn, is rigidly fastened to a mounting means 42 for suitably mounting to the structure of said optical tracking device 10 on surface 43, a first torquer coil 44 having an input 46 and output 47 for controlling vertical axis position, a second torquer coil 48 (represented by a broken line) having an input 50 and output 52 for controlling horizontal axis position, a first pickoff coil 54 having an input 56 and an output 58 and being magnetically responsive to said torquer coil 44 to provide a vertical feedback signal, a second pickoff coil 60 (represented by a broken line) having an input 62 and an output 64 being magnetically responsive to said torquer coil 49 to provide a horizontal feedback signal, and a mounting surface 66 at its free end. the two-axis electromagnetic flexure means 16 has said quadrant array detector means 18 rigidly mounted on surface 66 to provide a means of physically moving the detector means 18 as a function of electronic closed-loop error-measuring circuitry responsive to said detector means vertical and horizontal error signals.

The optical tracking device 10 further has a magnifying scope means 68 rigidly attached thereto for accomplishing tracking system target lock-on through visual observance by the tracking system operator. Therefore, during target acquisition mode the two-axis electromagnetic flexure means 16 is boresighted with the scope means 68 to insure that said quadrant array detector 18 sees the identical target that the operator sees at the instant the operator switches from target acquisition mode to target track mode by means of switch 70, shown in FIG. 1.

At the instant the optical tracking device 10 is switched to the target-tracking mode, said device functions as a closed-loop system. A summing circuit 72 is responsive to said quadrant array detector outputs $A$, $B$, $C$, and $D$, to derive a reference signal $A+B+C+D$. A subtractor circuit 74 is responsive to said quadrant array detector outputs $A$ and $D$ to derive an error signal $A-D$. A subtractor circuit 76 is responsive to said quadrant array detector outputs $B$ and $C$ to derive an error signal $B-C$. A summing circuit 78 is responsive to subtractor circuit 74 and 76 outputs to derive a vertical position error signal $A+B-(C+D)$. A subtracting circuit 80 is responsive to subtractor circuit 74 and 76 outputs to derive a horizontal position error signal $A+C-(B+D)$. The above addition and subtraction of signals $A$, $B$, $C$, and $D$ from the quadrant array detector means 18 may be accomplished with conventional pulse transformers without degrading the signal-to-noise ratio of the system. Further, if the summing and differencing is done by pulse transformers, it will be relatively easy to optimize the match of detector output impedance to the input impedance of the following circuitry. Additionally, it is noted that the error signals may have plus or minus signal voltage level.

A first amplifier 82 is responsive to reference signal $A+B+C+D$ to provide a predetermined amount of gain thereto. Said amplifier 82 further has a predetermined bandwidth which presets overall system response. To detect the presence of a localized source of light in pulse form, said reference signal $A+B+azD$ is passed through a threshold detector 84. The threshold voltage of said threshold detector 84 is adjusted at the minimum signal level to optimize the ratio of target detection probability to false target detection probability. When said signal $A+B+C+D$ exceeds the threshold voltage setting a trigger pulse is supplied to a gate generator 86. Said gate generator 86 has a pulse output for controlling the flow of signals $A+B+C+D$, $A+B-(C+D)$ and $A+C-(B+D)$ through the system. Reference signal $A+B+C+D$ is passed from the output of said amplifier 82 through a time delay network 88 to a gate 90 to obtain coincidence between said signal $A+B+C+D$ and said gate generator 86 pulse output. Said gate 90 is opened in response to said gate generator pulse output to pass reference signal $A+B+C+D$ to a sample and hold circuit 92. A sample pulse generator 94 is responsive to the trailing edge of said gate generator 86 pulse output to generate an output pulse. Said sample and hold circuit 92 accepts signal $A+B+C+D$ flow from gate 90 during the time interval said gate generator 86 has a pulse output and provides an output pulse to an amplifier and filter network 96 in response to said sample pulse generator 94 output pulse. The amplifier and filter network 96 provides automatic gain control and closed-loop stability feedback to said first amplifier 82. Said gate 90 is comprised of a field effect transistor which provides bipolar gating action, an RC filter, and an emitter follower stage, in that signal flow order. The action of the filter is to provide some degree of pulse averaging while the gate 90 is open and to give several microseconds of pulse stretching after the gate 90 is closed. The emitter follower stage is used to drive the sample and hold circuit 92 which is comprised of a field effect transistor and a storage capacitor. Said sample pulse generator 94 has an output pulse of about 1-microsecond duration.

A second amplifier 98 is responsive to said horizontal position error signal $A+C-(B+D)$ to provide a predetermined amount of gain thereto. The signal $A+C-(B+D)$ is passed from the output of said amplifier 98 through a time delay network 100 to gate 102 to obtain coincidence between said signal $A+C-(B+D)$ and said gate generator 86 pulse output. Said gate 102 is opened in response to said gate generator pulse output to pass horizontal position error signal $A+C-(B+D)$ to a sample and hold circuit 104. Said sample and hold circuit 104 accepts signal $A+C-(B+D)$ flow from gate 102 during the time interval said gate generator 86 has a pulse output, and provides an output pulse to an integrator circuit 106. Said gate 102 is comprised of a field effect transistor which provides bipolar gating action, an RC filter, and an emitter follower stage, in that signal flow order. The action of the filter is to provide some degree of pulse averaging while the gate 102 is open and to give several microseconds of pulse stretching after the gate 102 is closed. The emitter follower stage is used to drive the sample and hold circuit 104 which is comprised of a field effect transistor and a storage capacitor. Thus, the pulse stretching puts more energy into the storage capacitor than would the error pulse without stretching, which results in a pulse power gain input to said integrator circuit 106. The integrator circuit 106 is a high-gain servoamplifier whose output current is proportional to said horizontal position error signal $A+C-B+D)$ input. The overall horizontal tracking loop is closed through the two-axis electromagnetic flexure means 16 of detector assembly 14 which receives the output current of integrator circuit 106 through switch 70. Said integrator circuit 106 output current is passed through said torquer coil 48 to electromagnetically move said two-axis electromagnetic flexure means 16 to horizontally align said quadrant array detector 18 symmetrically with respect to said source of localized light 12. This horizontal movement may be in either direction. The pickoff coil 60, being magnetically responsive to said torquer coil 48, therefore has a current developed therein proportional to the current in torquer coil 48. This pickoff coil current is used as feedback from the detector assembly 14 to the input of said integrator circuit 106 to provide said integrator circuit 106 a stable closed-loop relative to said two-axis electromagnetic flexure means 16. Horizontal movement of said flexure means 16 will continue until the error signal input $A+C-(B+D)$ to said integrator circuit 106 is nulled as a result of said array detector being horizontally centered relative to said localized source of light 12.

A third amplifier 108 is responsive to said vertical position error signal $A+B-(C+D)$ to provide a predetermined amount of gain thereto. The signal $A+B-(C+D)$ is passed from the output of said amplifier 108 through a time delay network 110 to a gate 112 to obtain coincidence between said signal $A+B-(C+D)$ and said gate generator 86 pulse output. Said gate 112 is opened in response to said gate generator pulse output to pass vertical position error signal $A+B-(C+D)$ to a sample and hold circuit 114. Said sample and hold circuit 114 accepts signal $A+B-(C+D)$ flow from gage 112 during the time interval said gate generator 86 has a pulse output, and provides an output pulse to an integrator circuit 116. Said gate 112 is comprised of a field effect transistor which provides bipolar gating action, an RC filter, and an emitter follower stage, in that signal flow order. The action of the filter is to provide some degree of pulse averaging while the gate 112 is open and to give several microseconds of pulse stretching after the gate 112 is closed. The emitter follower stage is used to drive the sample and hold circuit 114 which is comprised of a field effect transistor and a storage capacitor. Thus, the pulse stretching puts more energy into the storage capacitor than would the error pulse without stretching, which results in a pulse power gain input to said integrator circuit 116. The integrator circuit 116 is a high-gain servoamplifier whose output current is proportional to said vertical position error signal $A+B-C+D)$ input. The overall vertical tracking loop is closed through the two-axis electromagnetic flexure means 16 of detector assembly 14 which receives the output current of integrator circuit 116 through switch 70. Said integrator circuit 116 output current is passed through said torquer coil 44 to electromagnetically move said two-axis electromagnetic flexure means 16 to vertically align said quadrant array detector 18 symmetrically with respect to said source of localized light 12. This vertical movement may be in either direction. The pickoff coil 54, being magnetically responsive to said torquer coil 44, therefore has a current developed therein proportional to the current in torquer coil 44. This pickoff coil current is used as feedback from the detector assembly 14 to the input of said integrator circuit 116 to provide said integrator circuit 116 a stable closed-loop relative to said two-axis electromagnetic flexure means 16. Vertical movement of said flexure means 16 will continue until the error signal input $A+B-(C+D)$ to said integrator circuit 116 is nulled as a result of said array detector being vertically centered relative to said localized source of light 12.

The required power supplies for the electronics may be supplied by any one of the conventional techniques since stringent controls on currents, voltages and total power are not imposed by the optical control device 10.

Additionally, meters 120 and 122 are responsive, respectively, to display vertical and horizontal angular error between the optical tracking device boresight and the radiant source of localized light 12.

MODE OF OPERATION OF THE PREFERRED EMBODIMENT

To properly accomplish target acquisition, the optical tracking device 10 must be suitably mounted for tracking an airborne guided missile or similar object having mounted thereon a localized source of light, such as an injection laser. Moreover, the switch 70 must be positioned in the target acquisition mode.

The operator of the optical tracking device will, where possible, visually acquire the target he desires to track. The operator will then maneuver the optical tracking device 10 until the vertical and horizontal crosshairs of the sighting scope 68 are directly centered on the target. The operator will then throw switch 70 to the target tracking mode position.

During the period of time required for target acquisition, while in the target acquisition mode, the outputs of said integrator circuits 106 and 116 will be respectively, shorted to their inputs by means of switch 70 to preclude their output error signals from deflecting the detector assembly 14 and disturbing the boresighting between said detector assembly 14 and said sighting scope 68.

When switch 70 is placed in the target tracking mode position said integrator circuits 106 and 116 will be connected to their respective torquer coils 48 and 44 and the optical tracking device will operate as a closed-loop system. It is assumed that upon initiation of target tracking the target source of light is centered vertically and horizontally with respect to said quadrant array detector means 18. Thus, vertical or horizontal error signals will not be developed to cause deflection of said two-axis electromagnetic flexure means 16 and a nulled condition will exist. However, since the target may be moving at a high velocity its vertical and horizontal position relative to the nulled condition may change rapidly. It is assumed now, that the target has moved from the on-axis or nulled condition, depicted in FIG. 2, to a different vertical and horizontal position as shown in FIG. 3. Since the magnitude of the outputs from each quadrant of the array detector 18 is a function of the quadrant area exposed to the source of light, the relationship of the outputs of the quadrants is as follows: $B>A>DC$. It is assumed further, that the target is of sufficient intensity to be recognized by said threshold detector circuit 84 as a real target, which allows the system to be responsive to vertical and horizontal error signals. The summing circuit 78 will derive a vertical position error signal $A+B-(C+D)$ which will pass through amplifier 108, time delay 110, gate 112, sample and hold circuit 114 and into integrator circuit 116 to develop current through torquer coil 44 and thus deflect the flexure means 16 up in a vertical direction until signals $A+B=C+D$. This condition will again establish a vertical null. The subtracting circuit 80 will derive a horizontal position error signal $A+C-(B+D)$ which will pass through amplifier 98, time delay 100, gate 102, sample and hold circuit 104 and into integrator circuit 106 to develop current through torquer coil 48 and thus deflect the flexure means 16 to the right (as viewed from the quadrant array detector 18 end of the flexure means 16) until signals $A+C=B+D$. This condition will again establish a vertical null. Since signals $A+B-(C+D)$ and $A+C-(B+D)$ are processed through their respective circuitry completely independently of each other, vertical and horizontal repositioning can be accomplished simultaneously. As the target 12 moves to new positions the detector assembly 14 will track said target 12 in response to vertical and horizontal error signals.

It is understood that when the source of light 12 falls elsewhere on the quadrant array detector 18, an entirely different signal amplitude relationship will exist between said outputs $A$, $B$, $C$, and $D$; however, the same summing and differencing techniques are used to accomplish repositioning of the flexure means 16 whatever the relationship may be.

DESCRIPTION OF THE MODIFIED EMBODIMENT

Figure 6:
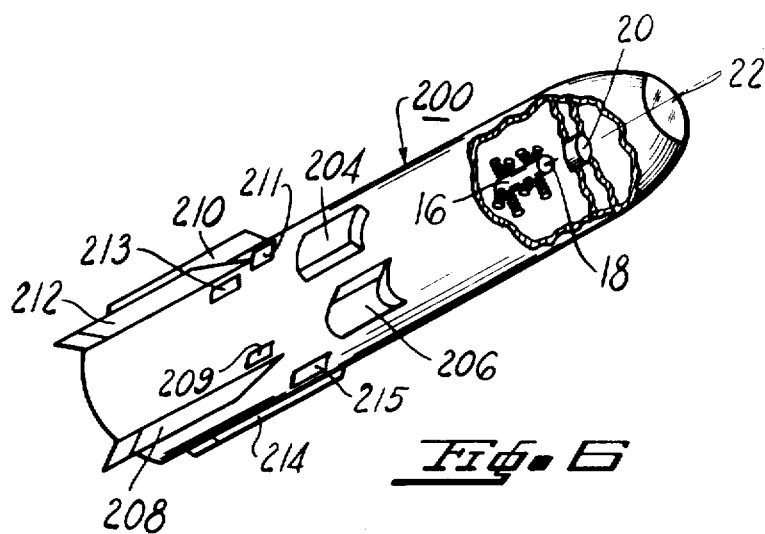
FIG. 6 is a pictorial perspective, partly sectioned, view of a missile guidance system depicting a modified form of this invention.

In the optical missile guidance system embodiment shown in FIG. 6, those parts which are identical to corresponding parts of the preferred embodiment will be given the same identifying numbers.

Suitably installed in a missile 200 is the optical missile guidance system, not shown, which includes all the elements associated with the optical control device 10. All the elements of said control device 10 perform the same function when used in said guidance system. The optical missile guidance system further includes a missile motion stabilization means 204, a roll stabilization means 206, two vertical control fins 208 and 210 and their respective closed-loop torquer motors 209 and 211 mounted on said missile 200, and two horizontal control fins 212 and 214 and their respective closed-loop torquer motors 213 and 215 mounted on said missile 200.

Missile motion stabilization is required to preclude lateral missile motion errors from being sensed and corrected for by the flexure means 16. The control fins 208, 210, 212, and 214, are responsive to said missile motion stabilization means 204 which will generally contain a gyro to sense and provide corrective signal outputs for lateral missile movements resulting from crosswinds, dense airmasses or the like.

The optical missile guidance system will also require roll stabilization. Too much roll could produce interaction between the channels and eventually bring about instability of the system. Since all systems have a finite response time, it is necessary for reliable operation that during this response time the missile does not roll too much. The control fins 208, 210, 212, and 214 are responsive to said roll stabilization means 206 to preclude system instability resulting from missile roll.

The missile motion stabilization means, the roll stabilization means and the vertical and horizontal control fin means are of the conventional variety and are not shown in detail on the drawing.

Figure 7:
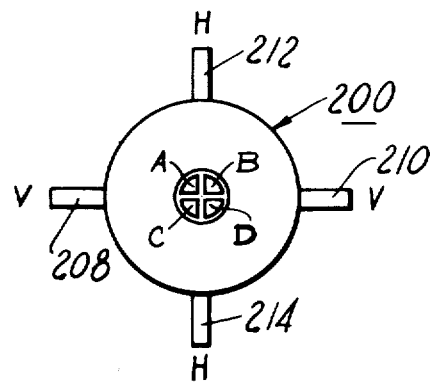
FIG. 7 is a view of FIG. 6 looking from the front.

Said missile 200 is guided to its target by means of vertical and horizontal error signals derived in the optical control device 10 available at terminals 216 and 218, respectively, shown in FIG. 1. Since the said error signals used to control the flexure means 16 represent angular error between the boresight of the flexure means 16 as well as the missile 200 and the target source of light 12, these same signals are used to guide the missile to the target. FIG. 7 shows the relationship of the quadrant array detector 18 to the control fins 208, 210, 212, and 214. A vertical position error signal appearing at terminal 216 would be passed to closed-loop torquer motors 209 and 211 for control of vertical control fins 208 and 210, respectively. A horizontal position error signal appearing at terminal 218 would be passed to closed-loop torquer motors 213 and 215 for control of horizontal control fins 212 and 214, respectively.

The vertical control fins 208 and 210 although functioning independently of each other respond identically to the same vertical position error signal to control missile vertical position. The horizontal control fins 212 and 214 although functioning independently of each other respond identically to the same horizontal position error signal to control missile horizontal position.

It may be parenthetically mentioned that missile motion stabilization and roll stabilization control signals may be independently superimposed upon the horizontal and vertical control signals being communicated to their respective control fins.

MODE OF OPERATION OF MODIFIED EMBODIMENT

To properly accomplish target acquisition, the missile 200 must be suitably mounted on an aircraft and have its optical missile guidance system directed along the line of flight of the aircraft. Further, the detector assembly 14, comprised of the two-axis electromagnetic flexure means 16 and the quadrant array detector means 18, must be boresighted with the pilot's optical gun sight.

The pilot of the aircraft will, where possible, visually acquire the target he desires to track. The pilot will then maneuver the aircraft until the optical gunsight is centered on the target. The pilot will then throw switch 70 to the target tracking mode position.

One of several conventional techniques, such as a closed-circuit television monitor displaying to the pilot what the missile sees, or a target correlation computer to verify the integrity of the target signal, may be used to verify missile-tracking system lock-on with respect to the target.

At the instant the pilot is assured, by whatever electronic verification system he is using, that proper target lock-on does exist, he will release missile 200 from the aircraft to approach the chosen target as directed by its optical missile guidance system 10. It is noted, although not shown, that horizontal and vertical control signals cannot be provided to the missile 200 control fins prior to release of missile 200 from the aircraft to avoid possible instabilities in control of the aircraft.

Once the missile 200 is launched from the aircraft, it is understood that guidance and control signals will be obtained and processed as described in the preferred embodiment.

While the specific details have been herein shown and described, the invention is not confined thereto, as other substitutions can be made within the spirit and scope of the invention.

It is claimed:
1. An optical control device comprising:
   a quadrant array detector means responsive to a localized source of light and having outputs $A$, $B$, $C$, and $D$, from quadrants 2, 1, 3, and 4, respectively, each variable as a function of their respective exposure to said localized source of light;
   an optical means intermediate said quadrant array detector means and said source of light for collecting said light to form an image on said quadrant array detector means;
   a flexure means for flexing along two axes in response to an electromagnetic field, said flexure means having connected thereto said quadrant array detector means for controlling the position of said detector means relative to said localized source of light so as to proportion said source of localized light equally in each of said detector quadrants;
   a first means responsive to said quadrant array detector means for deriving reference signal $A+B+C+D$;
   a second means responsive to said quadrant array detector means for deriving signal $A+B-(C+D)$;
   a third means responsive to said quadrant array detector means for deriving signal $A+C-(B+D)$;
   a threshold detector means responsive to said first means as a function of a predetermined signal-to-noise ratio to control the flow of signals $A+B-(C+D)$ and $A+C-(B+D)$ therethrough;
   first and second amplifier means responsive, respectively, to signals $A+B-(C+D)$ and $A+C-(B+D)$ for providing current representing true angular errors between said quadrant array detector means and a line of sight to said localized source of light;
   said flexure means being responsive to said first and second amplifier means currents to reposition itself until said quadrant array detector outputs are equal;
   said first amplifier means current controlling vertical position axis of said flexure means; and
   said second amplifier means current controlling horizontal position axis of said flexure means.

2. An optical control device as claimed in claim 1, including a filter means intermediate said optical means and said localized light source to limit spectral response of said quadrant array detector.

3. An optical control device as recited in claim 1, wherein the device is used as a closed-loop tracking system.

4. A closed-loop tracking system as recited in claim 3, including an optical magnifying scope mounted externally on said tracking system for accomplishing tracking system target lock-on by visual observance.

5. An optical control device as recited in claim 1, wherein the device is used as a guidance system further including roll and lateral missile motion stabilization.

6. An optical control device are recited in claim 1, wherein said localized source of light approaches that of a point source and whose wavelength of emission lies in the visible or near infrared portions of the electromagnetic spectrum.

7. An optical control device as recited in claim 1, wherein said quadrant array detector means comprises:
   four photodiodes;
   each of said diodes forming one quadrant and being suitably mounted in a single package with close spacing of each diode relative to the others;
   each diode having a signal output.

8. An optical control device as recited in claim 1, wherein said filter means is of predetermined transmission characteristics as a function of the intended use of said optical control device.

9. An optical control device, as recited in claim 1, wherein said flexure means comprises:
   a means for providing cantilevered support;
   a first element responsive to current for bidirectionally positioning said cantilevered means in its vertical plane;
   a second element responsive to current for bidirectionally positioning said cantilevered means in its horizontal plane;
   said first and second elements being independently responsive simultaneously;
   a first pickoff element magnetically responsive to said first element to generate a current therein for use in a series flow closed-loop relationship with a first electronic control means which positions said first element;
   a second pickoff element magnetically responsive to said second element to generate a current therein for use in a series flow closed-loop relationship with a second electronic control means which positions said second element.

10. An optical control device as recited in claim 1, wherein said first means responsive to said quadrant array detector means is a pulse transformer having inputs $A$, $B$, $C$, and $D$, and an output $A+B+C+D$.

11. An optical control device as recited in claim 1, wherein said second means responsive to said quadrant array detector means comprises:
   a first subtraction means having inputs $A$ and $D$, and an output $A-D$;
   a second subtraction means having inputs $B$ and $C$, and an output $B-C$;

an addition means having inputs from said first and second subtraction means, and an output $A+B-(C+D)$.

12. An optical control device as recited in claim 1, wherein said third means responsive to said quadrant array detector means comprises:
   a first subtraction means having inputs $A$ and $D$, and an output $A-D$;
   a second subtraction means having inputs $B$ and $C$, and an output $B-C$;
   a third subtraction means having inputs from said first and second subtraction means, and an output $A+C-(B+D)$.

13. An optical control device as recited in claim 1, wherein said first and second amplifier means each comprise:
   an input network to provide for pulse averaging and pulse stretching;
   a pulse driver stage responsive to said input network for passing said signal to a holding circuit;
   said holding circuit having an output upon a command signal from said threshold detector means;
   a high-gain servoamplifier being responsive to said holding circuit output to generate an output control signal proportional to said signal input.

14. A photosensitive electromagnetic detector means comprising:
   a means for providing cantilevered support;
   a first element responsive to current for bidirectionally positioning said cantilevered means in its vertical plane;
   a second element responsive to current for bidirectionally positioning said cantilevered means in its horizontal plane;
   said first and second elements being independently responsive simultaneously;
   a first pickoff element magnetically responsive to said first element to generate a current therein for use in a series flow closed-loop relationship with a first electronic control means which positions said first element;
   a second pickoff element magnetically responsive to said second element to generate a current therein for use in a series flow closed-loop relationship with a second electronic control means which positions said second element;
   a quadrant array detector means rigidly mounted on the free end of said cantilevered means;
   said quadrant array detector means being comprised of four photodiodes with each of said diodes forming one quadrant and being suitably mounted in a single package with close spacing of each diode relative to the others to optimize the quadrant photosensitive area; and
   said quadrant array detector means being responsive to a localized source of light and having outputs $A$, $B$, $C$, and $D$, from quadrants 2, 1, 3, and 4, respectively, each variable as a function of their respective exposure to said localized source of light.

15. A flexure means for flexing along two axes in response to an electromagnetic field, said flexure means comprising:
   a means for providing cantilevered support;
   a first element responsive to current for bidirectionally positioning said cantilevered means in its vertical plane;
   a second element responsive to current for bidirectionally positioning said cantilevered means in its horizontal plane;
   a first pickoff element magnetically responsive to said first element to generate a current therein for use in a series flow closed-loop relationship with a first electronic control means which positions said first element; and
   a second pickoff element magnetically responsive to said second element to generate a current therein for use in a series flow closed-loop relationship with a second electronic control means which position said second element.

16. A tracking device comprising:
   array detector means having at least three sections responsive to a source of light, each section having an output which represents its exposure to said source of light;
   flexure means operatively connected to said array detector means for controlling the position of said array detector means relative to said source of light to proportion said source of light equally in each section;
   first means responsive to said outputs of said array detector means for generating a first signal;
   second means responsive to said outputs of said array detector means for generating a second signal;
   third means responsive to said outputs of said array detector means for generating a reference signal; and
   threshold detector means responsive to said reference signal to control the flow of said first and second signals unless a predetermined signal-to-noise ratio has been exceeded;
   said flexure means including a cantilevered shaft that bends in response to a magnetic field to reposition itself until said outputs of said array detector means are equal, said first and second signals controlling vertical and horizontal bending, respectively, of said flexure means.

17. The tracking device, as recited in claim 16, wherein said array detector means has four quadrants, each quadrant corresponding to one of said sections, said first signal being generated when first opposing halves of said quadrant sections are not exposed to the same amount of said source of light, said second signal being generated when second opposing halves of said quadrant sections which are perpendicular to said first opposing halves are not exposed to the same amount of said source of light.

18. The tracking device, as recited in claim 17, further comprising amplifier means for magnifying said first and second signals to drive perpendicularly located coils on said flexure means to generate said magnetic fields.

19. The tracking device, as recited in claim 17, further comprising:
   optical means intermediate said array detector means and said source of light; and
   pickup means for determining the position of said flexure means after a repositioning has taken place.